United States Patent
Kim et al.

(10) Patent No.: US 11,366,045 B2
(45) Date of Patent: Jun. 21, 2022

(54) APPARATUS AND METHOD FOR ANALYSIS OF MULTI-LAYER ADHESIVE FILM

(71) Applicant: LG CHEM, LTD., Seoul (KR)

(72) Inventors: So Yeon Kim, Daejeon (KR); Rin Jang, Daejeon (KR); Joon Seok Lee, Daejeon (KR); Byoung Hyoun Kim, Daejeon (KR); Bumgyu Choi, Daejeon (KR); Su Youn Han, Daejeon (KR)

(73) Assignee: LG CHEM, LTD., Seoul (KR)

( * ) Notice: Subject to any disclaimer, the term of this patent is extended or adjusted under 35 U.S.C. 154(b) by 188 days.

(21) Appl. No.: 16/925,663

(22) Filed: Jul. 10, 2020

(65) Prior Publication Data

US 2021/0108997 A1    Apr. 15, 2021

(30) Foreign Application Priority Data

Oct. 15, 2019   (KR) .......................... 10-2019-0127567

(51) Int. Cl.
  *G01N 1/42* (2006.01)
  *G01N 1/28* (2006.01)
(52) U.S. Cl.
  CPC ................ *G01N 1/42* (2013.01); *G01N 1/286* (2013.01)
(58) Field of Classification Search
  CPC ........... G01N 1/42; G01N 1/286; G01N 1/06; G01N 1/04; G01N 1/30; G01N 35/00029
  See application file for complete search history.

(56) References Cited

U.S. PATENT DOCUMENTS

| | | | | |
|---|---|---|---|---|
| 5,755,919 A | * | 5/1998 | Ueda | .................... G03H 1/0252 156/273.5 |
| 2007/0045118 A1 | * | 3/2007 | Maruo | ............. G01N 27/44778 204/606 |
| 2009/0205959 A1 | * | 8/2009 | Fujita | ............... G01N 27/44791 204/451 |
| 2014/0137713 A1 | | 5/2014 | Yoshida et al. | |

FOREIGN PATENT DOCUMENTS

| | | | | |
|---|---|---|---|---|
| CA | 2937046 A1 | * | 1/2018 | ............. G01N 1/286 |
| JP | 2004028910 A | | 1/2004 | |
| JP | 2005090987 A | | 4/2005 | |
| JP | 2006194848 A | | 7/2006 | |
| JP | 2006329733 A | | 12/2006 | |
| JP | 4311702 B2 | * | 8/2009 | ....... H01L 21/67092 |
| JP | 2015072212 A | | 4/2015 | |
| JP | 2019109146 A | | 7/2019 | |
| WO | 2013019495 A1 | | 2/2013 | |
| WO | 2018168750 A1 | | 9/2018 | |

* cited by examiner

*Primary Examiner* — Francis C Gray
(74) *Attorney, Agent, or Firm* — Dentons US LLP

(57) ABSTRACT

The present disclosure relates to an apparatus and a method for analysis of a multi-layer adhesive film and provides the apparatus comprising a specimen tray unit; a blade unit; a liquid nitrogen supply unit; and a driving unit, and the method comprising a specimen fixing step; a specimen cooling step; a specimen pre-collection step; a specimen collection step; and a blade separation step.

11 Claims, 4 Drawing Sheets

[Fig. 1]
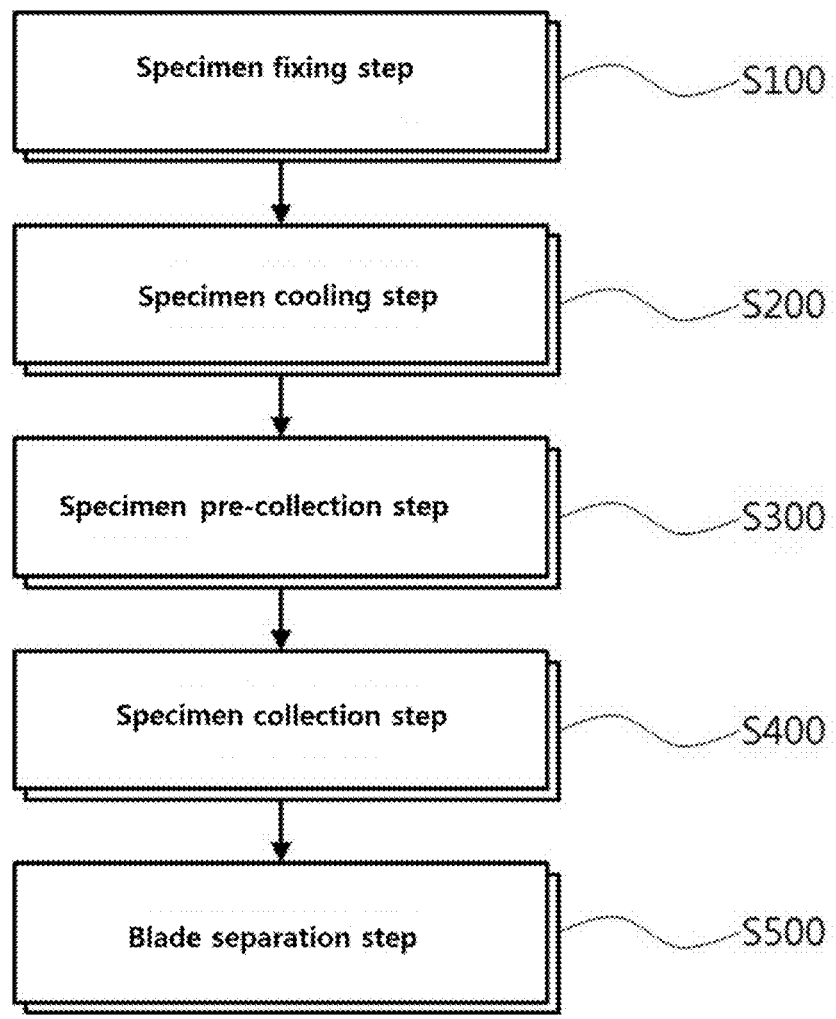

[Fig. 2]
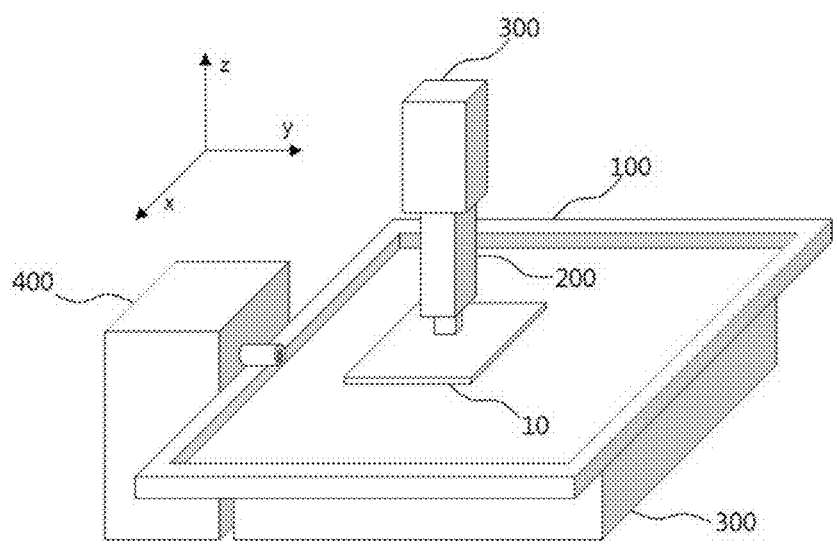
[Fig. 3]
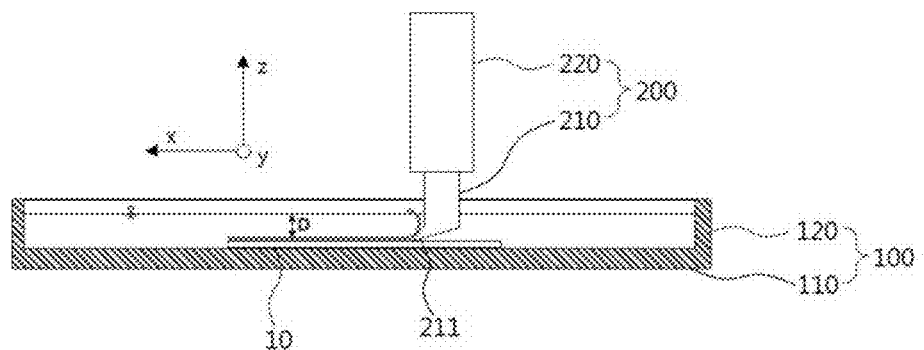
[Fig. 4]
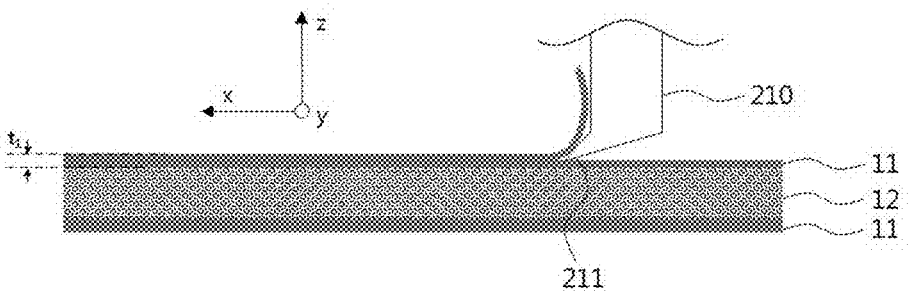

[Fig. 5]
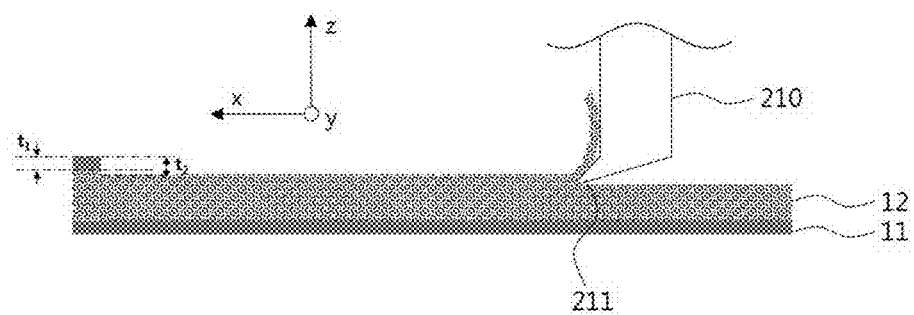
[Fig. 6]
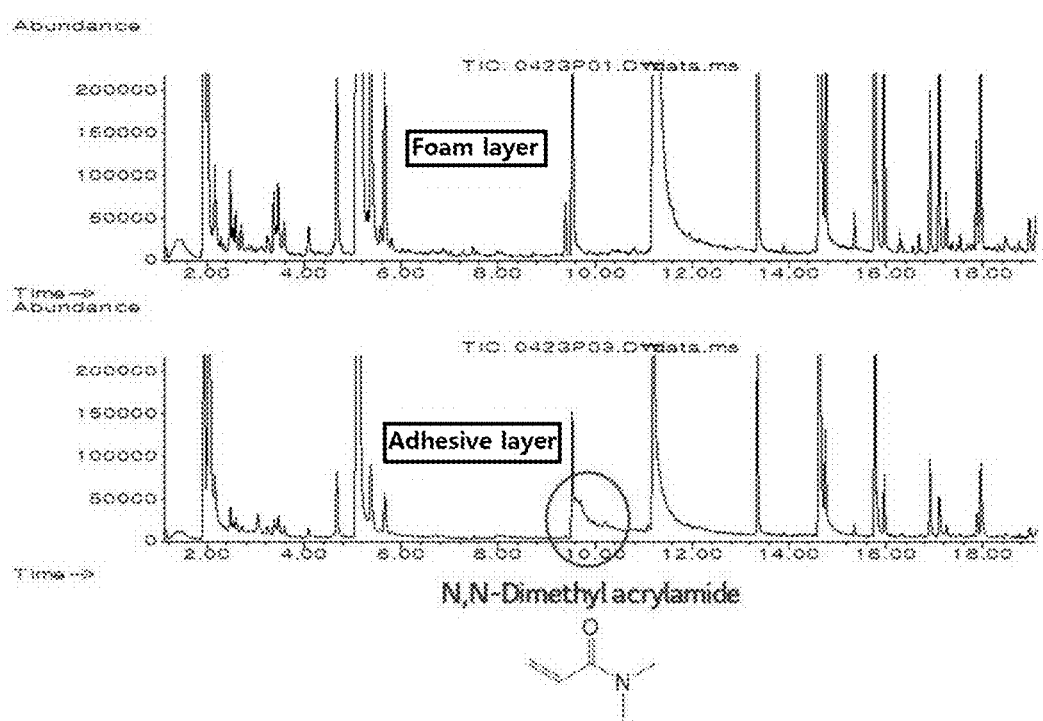

[Fig. 7a]
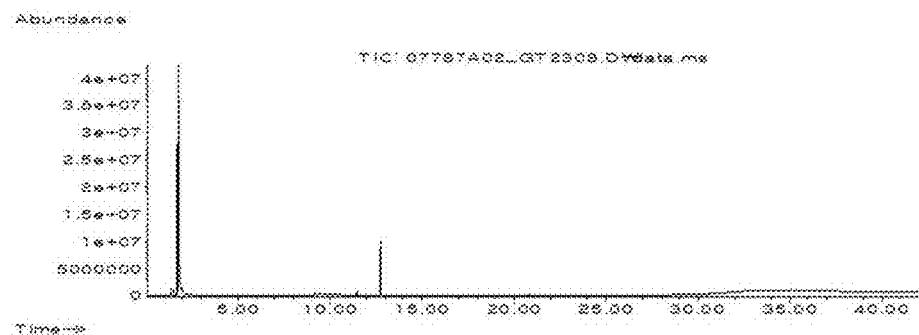
[Fig. 7b]
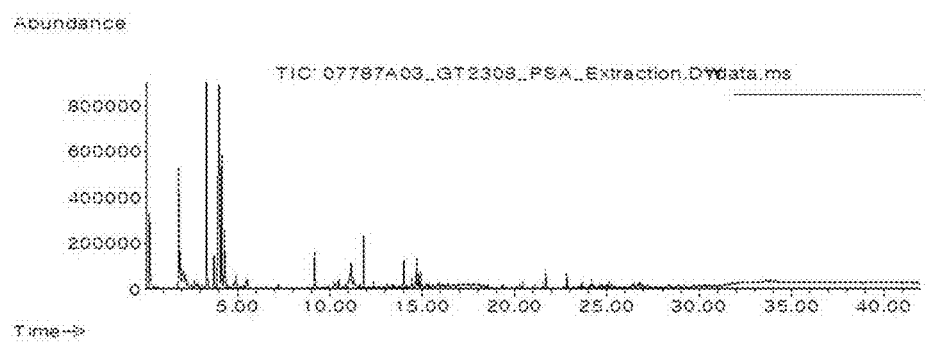
[Fig. 7c]
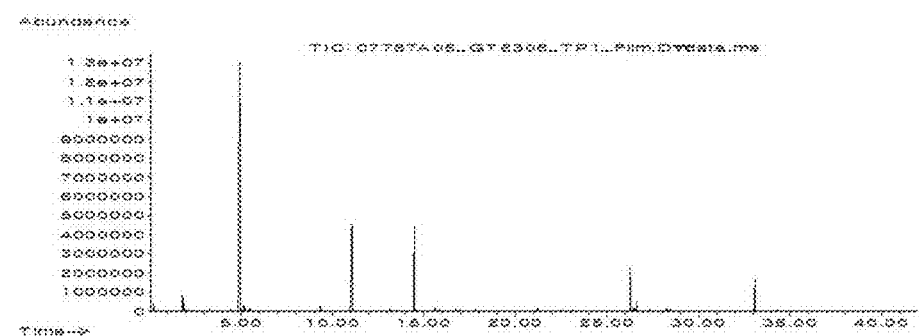

APPARATUS AND METHOD FOR ANALYSIS OF MULTI-LAYER ADHESIVE FILM

CROSS-REFERENCE TO RELATED APPLICATIONS

This application claims the benefit of and priority to Korean Application No. 10-2019-0127567, filed on Oct. 15, 2019, the disclosures of which are hereby incorporated by reference in their entirety for all purposes as if fully set forth herein.

TECHNICAL FIELD

The present disclosure relates to an apparatus and a method for analysis of a multi-layer adhesive film, in particular the apparatus for analysis of a multi-layer adhesive film and the method or analyzing a multi-layer structure film having adhesiveness or tackiness and a low hardness.

RELATED ART

For a multi-layer structure adhesive film such as an acrylic foam tape, with each layer having adhesiveness, it was difficult to separate each layer and to analyze the components of each layer.

Conventionally, in order to analyze a multi-layer structure adhesive film such as an acrylic foam tape, it was only possible to extract the entire film with a solvent and apply it to a gas chromatography/mass spectrometer (GC/MS) to check the overall components at once, or to take the portion estimated to be the depth of each layer in a very small amount and analyze it with Py-GC/MS (pyrolysis-gas chromatography/mass spectrometry). However, in both methods, a long-term pretreatment process is required, and components for each layer are incorporated, such that it is not actually possible for the complete separation of each component.

In addition, in the case of the existing solvent extraction method, it was difficult to separate a specimen layer by layer due to the increased volume of the foam layer as well as a lengthy extraction and concentration process.

In addition, since the specimen collection for the existing Py-GC/MS was performed by peeling off components on the surface of the specimen with physical force of the analyst by cross-section or the like, the specimen was occasionally collected with components of a plurality of layers incorporated due to adhesiveness, and thus an analysis was not possible for the intermediate layer.

Therefore, there is a need for an apparatus and method for effectively analyzing a specimen of a multi-layer structure film having adhesiveness or tackiness and a very low hardness via simple pretreatment without incorporation of components of each layer.

Japanese Patent Publication No. 2006-329733 discloses a 'micro sampling device.'

PRIOR ART DOCUMENT

Patent Document (Patent Document 1) Japanese Patent Publication No. 2006-329733

SUMMARY OF THE INVENTION

The present invention relates to an apparatus and a method for analysis of a multi-layer adhesive film, in particular the apparatus for analysis of a multi-layer adhesive film and the method for analyzing a multi-layer structure film having adhesiveness or tackiness and a low hardness.

The technical problems to be solved by the present invention are not limited to the technical problems mentioned above, and other technical problems that are not mentioned above will be clearly understood by those skilled in the art from the following description.

The apparatus for analysis of a multi-layer adhesive film according to the present invention may comprise a specimen tray unit on which a specimen of a multi-layer structure adhesive film is mounted; a blade unit that is movable in a first vertical direction to a first surface of the specimen tray unit on which the specimen is mounted; a liquid nitrogen supply unit for supplying liquid nitrogen so that the specimen mounted on the specimen tray unit is immersed; and a driving unit for moving the specimen tray unit or the blade unit in a direction parallel to the first surface.

In the apparatus for analysis for a multi-layer adhesive film according to the present invention, the specimen tray unit may comprise a bottom surface portion including the first surface, the first surface being a flat surface to which the specimen is close contact, and a side wall portion protruding in a vertical direction to the first surface along the edge of the bottom surface portion, wherein the liquid nitrogen may be filled in a container formed of the bottom surface portion and the side wall portion.

In the apparatus for analysis for a multi-layer adhesive film according to the present invention, the bottom surface portion may be made of stainless steel, and the adhesive layer may be formed on the surface of the specimen facing the bottom surface portion so that the specimen adheres to the bottom surface portion.

In the apparatus for analysis of a multi-layer adhesive film according to the present invention, the specimen may be formed of adhesive layers on both sides, and a foam layer may be provided between the two adhesive layers.

In the apparatus for analysis of a multi-layer adhesive film according to the present invention, the driving unit may comprise a first driving portion for moving the blade unit in the first direction, a second driving portion for moving the blade unit or the specimen tray unit in a second direction perpendicular to the first direction, and a third driving portion for moving the blade unit or the specimen tray unit in a third direction perpendicular to the first direction and the second direction.

The method for analyzing a multi-layer adhesive film according to the present invention may comprise a specimen fixing step of adhering a specimen of a multi-layer structure adhesive film to a specimen tray unit; a specimen cooling step of immersing the specimen adhered to the specimen tray unit in liquid nitrogen; a specimen pre-collection step of approaching a blade unit to a first surface of the specimen tray unit on which the specimen is adhered to contact or insert one end of the blade unit into the specimen; a specimen collection step of moving the blade unit in a direction parallel to the first surface on the specimen tray unit to scrape the specimen; and a blade separation step of moving the blade unit to be spaced apart from the specimen tray unit and the specimen.

In the specimen fixing step of the method for analyzing a multi-layer adhesive film according to the present invention, the specimen may be formed of an adhesive layer on the surface, and the specimen may be fixed to the specimen tray unit by bringing the adhesive layer into contact with the first surface of the specimen tray unit.

In the specimen cooling step of the method for analyzing a multi-layer adhesive film according to the present invention, the liquid nitrogen may be supplied into the specimen tray unit so that the specimen is immersed by 3 to 5 mm.

In the method for analyzing a multi-layer adhesive film according to the present invention, the time taken from immersing the specimen in liquid nitrogen in the specimen cooling step to the blade separation step may be 20 seconds or less.

In the method for analyzing a multi-layer adhesive film according to the present invention, after 2 seconds or more from immersing the specimen in liquid nitrogen in the specimen cooling step, a specimen collection step may be performed.

In the method for analyzing a multi-layer adhesive film according to the present invention, the specimen may be formed of adhesive layers on both sides, and a foam layer may be provided between the two adhesive layers, and the specimen pre-collection step and the specimen collection step may be repeatedly performed when taking the foam layer.

Effect of the Invention

The apparatus and the method for analysis of a multi-layer adhesive film according to the present invention can easily separate a thin slice sample from a specimen without interlayer incorporation of the multi-layer specimen or loss of components, by a short-term pretreatment of the specimen.

In the apparatus and the method for analysis of a multi-layer adhesive film according to the present invention, the adhesiveness of a specimen is limited and the hardness is increased by creating a cryogenic environment around the specimen with liquid nitrogen, so that the specimen is not entangled or crushed in the surrounding structure and a thin slice sample can be accurately taken from a desired region on the specimen when taking the thin slice sample of each layer from the multi-layer specimen.

BRIEF DESCRIPTION OF THE DRAWINGS

FIG. 1 is a block diagram showing a method for analysis of the multi-layer adhesive film.

FIG. 2 is a conceptual diagram showing an apparatus for analysis of the multi-layer adhesive film.

FIG. 3 is a side view showing a specimen tray unit and a blade unit.

FIG. 4 is a side view showing a specimen and a blade unit when taking an adhesive layer.

FIG. 5 is a side view showing a specimen and a blade unit when taking a foam layer.

FIG. 6 is a graph showing the analysis results of a specimen by the apparatus for analysis of the multi-layer adhesive film and the method according to the present invention.

FIG. 7a is a graph showing the results of analyzing whole layers of a specimen, by a conventional analysis method.

FIG. 7b is a graph showing the results of analyzing the adhesive layer, which is a surface layer of the specimen, by a conventional analysis method.

FIG. 7c is a graph showing the results of analyzing the foam layer, which is an intermediate layer of the specimen, by a conventional analysis method.

DETAILED DESCRIPTION OF THE INVENTION

Hereinafter, embodiments according to the present invention will be described in detail with reference to the accompanying drawings. In this process, the size or shape of components shown in the drawings may be exaggerated for clarity and convenience of description. In addition, terms specifically defined in consideration of the configuration and operation of the present invention may vary depending on the intention or practice of the user or operator. Definitions of these terms should be made based on the contents throughout this specification.

In the description of the present invention, it should be noted that the orientation or positional relationship indicated by the terms, "center", "top", "bottom", "left", "right", "vertical", "horizontal", "inside", "outside", "one side" and "other side", etc. is based on the orientation or positional relationship shown in the drawings, or the orientation or positional relationship that is usually arranged when using the product of the present invention, and it is only for the description of the present invention. It is not to be understood as limiting the present invention as it does not suggest or imply that the indicated device or element must have a specified orientation and be constructed or manipulated with the specified orientation.

FIG. 1 is a block diagram showing a method for analysis of the multi-layer adhesive film. FIG. 2 is a conceptual diagram showing an apparatus for analysis of the multi-layer adhesive film. FIG. 3 is a side view showing a specimen tray unit 100 and a blade unit 200. FIG. 4 is a side view showing a specimen 10 and a blade unit 200 when taking an adhesive layer 11. FIG. 5 is a side view showing a specimen 10 and a blade unit 200 when taking a foam layer 12. FIG. 6 is a graph showing the analysis results of a specimen 10 by the apparatus for analysis for the multi-layer adhesive film and the method thereof according to the present invention.

Hereinafter, the apparatus for analyzing of a multi-layer adhesive film and the method thereof according to the present invention will be described in detail with reference to FIGS. 1 to 6.

Conventionally, when analyzing components for each layer of the low-hardness multi-layer film including the adhesive layer 11, such as an acrylic foam tape, a cumbersome pretreatment was required, and components of each layer are incorporated, so that it was not actually possible for the complete separation of each component.

In the apparatus for analysis of a multi-layer adhesive film according to the present invention, the adhesiveness of a specimen 10 is limited and the hardness is increased by creating a cryogenic environment around the specimen 10 with liquid nitrogen, so that the specimen 10 is not entangled or crushed in the surrounding structure and a thin slice sample can be accurately taken from a desired region on the specimen 10 when taking the thin slice sample of each layer from the multi-layer specimen 10.

As shown in FIG. 2, the apparatus for analysis for a multi-layer adhesive film according to the present invention may comprise a specimen tray unit 100 on which a specimen of a multi-layer structure adhesive film 10 is mounted, a blade unit 200 that is movable in a first vertical direction to a first surface 111 of the specimen tray unit 100 on which the specimen 10 is mounted, a liquid nitrogen supply unit 400 for supplying liquid nitrogen so that the specimen 10 mounted on the specimen tray unit 100 is immersed, and a driving unit 300 for moving the specimen tray unit 100 or the blade unit 200 in a direction parallel to the first surface 111. The first direction may be a z-axis direction on the coordinates illustrated in FIG. 2.

As shown in FIGS. 2 and 3, the specimen tray unit 100 includes a bottom surface portion 110 including the first surface 111 that is a flat surface to which the specimen 10 is close contact, and a side wall portion 120 protruding in a vertical direction to the first surface 111 along the edge of the bottom surface portion 110.

The specimen tray unit 100 may be filled with liquid nitrogen as a refrigerant for cooling the specimen 10. That is, the liquid nitrogen may be filled in a container formed of the bottom surface portion 110 and the side wall portion 120. Therefore, the bottom surface portion 110 and the side wall portion 120 may be made of stainless steel, which is a material having excellent cold resistance and less deformation with respect to temperature. The liquid nitrogen may be filled in the specimen tray unit 100 so that the specimen 10 can be immersed by about 3 mm or more. To collect the specimen 10 with the suppressed adhesiveness and the enhanced hardness, it may be desirable to take a thin slice sample while the specimen 10 is immersed in liquid nitrogen. Once all the liquid nitrogen is vaporized, the adhesiveness of the specimen 10 is immediately restored and the hardness is lowered, so it may be difficult to separate the thin slice sample form the specimen 10. Therefore, the liquid nitrogen may be filled in the specimen tray unit 100 so that the specimen 10 can be immersed by about 3 mm or more in consideration of the vaporization rate. For example, the liquid nitrogen is filled in the specimen tray unit 100 so that the distance D from the upper surface of the specimen 10 fixed to the specimen tray unit 10 to the liquid surface formed by liquid nitrogen is equal to or more or less than 3 to 5 mm. The height of the side wall portion 120 may be determined based on the immersion degree of the specimen 10 and the thickness of the specimen. For example, the height of the side wall portion may be 1.5 cm or more.

The specimen 10 may be fixed to the first surface 111 of the bottom surface portion 110 by an adhesive component. Therefore, the adhesive layer 11 may be formed on the surface of the specimen 10 facing the bottom surface portion 110 so that the specimen 10 adheres to the bottom surface portion 110. Since the specimen 10 is combined with the specimen tray unit 100 by adhesive force, it may be desirable that it adheres to the bottom surface portion 110 of the specimen tray unit 100 before the specimen 10 itself and the specimen tray unit 100 are cooled. Therefore, the specimen 10 may adhere to the bottom surface portion 110 before the liquid nitrogen is filled in the specimen tray unit 100.

The specimen 10 may be formed of adhesive layers 11 on both sides, and a foam layer 12 may be provided between the two adhesive layers 11. Specifically, the specimen 10 may have a three-layer structure laminated in the order of [adhesive layer 11]-[foam layer 12]-[adhesive layer 11] or a four-layer structure laminated in the order of [adhesive layer 11]-[foam layer 12]-[primer layer]-[adhesive layer 11].

The adhesive layer 11 may be a layer containing an adhesive component that allows the adhesive and the adherend to be adhered only by applying a short-term pressure at room temperature without using water, solvent, heat, or the like. The foam layer 12, which is a support, may be a layer in which pores are formed by dispersing gas or the like in a solid. The primer layer, which is coated on a substrate to modify the chemical properties of the surface thereof, may be a layer provided to improve the interfacial adhesion between the adhesive layer 11 and the acrylic foam layer 12 and impart high heat resistance.

In addition, since the specimen 10 may be deformed while being cooled, liquid nitrogen may be previously fixed to the bottom surface portion 110 before being filled in the specimen tray unit 100.

The blade unit 200 may comprise a blade portion 210 which is contacted or inserted into the specimen 10 to cut a part of the specimen 10 and a body portion 220 which has the blade portion 210 fixed and transmits a driving force of the driving unit 330 to the blade portion 210.

The blade portion 210 extends in the vertical direction (z-axis direction), and the lower end of the blade portion 210 is formed with a protruding part 211 protruding in a second direction, so that the thin slice sample to be taken while the blade portion 210 moves in the second direction can be accumulated on the upper surface of the protruding part 211. The bottom of the blade portion 20 may be formed to have an inclined surface so that an end of the protruding part 211 of the blade portion 210 can be located on the lowest end. Accordingly, when the blade portion 210 cuts off the specimen 10, friction can be reduced by minimizing the area where the bottom of the blade portion 210 contacts the specimen 10. The blade portion 210 may be a tungsten blade.

The body portion 220 may be coupled to the upper end of the blade portion 210.

The driving unit 300 may comprise a first driving portion for moving the blade unit 200 in a first direction, a second driving portion for moving the blade unit 200 or the specimen tray unit 100 in a second direction perpendicular to the first direction, and a third driving portion for moving the blade unit 200 or the specimen tray unit 100 in a third direction perpendicular to the first direction and the second direction. The second direction may be an x-axis direction on the coordinates illustrated in FIGS. 2 to 5. The third direction may be a y-axis direction on the coordinates illustrated in FIGS. 2 to 5.

The second driving portion may provide a driving force for the blade unit 200 to cut the specimen 10. Accordingly, the second driving portion may provide a driving force after the blade unit 200 approaches the specimen 10 by the driving force of the first driving portion.

The third driving portion may provide a driving force for changing the position of the blade unit 200 when the blade unit 200 changes the position of the specimen 10 to be cut. Accordingly, the third driving portion may provide a driving force while the blade unit 200 is spaced apart from the specimen 10. The second driving portion may also provide a driving force for changing the position of the blade unit 200, and in this case, the second driving portion may also provide a driving force while the blade unit 200 is spaced apart from the specimen 10.

Hereinafter, a method for analyzing a multi-layer adhesive film using the apparatus for analyzing a multi-layer adhesive film of the present invention will be described in detail.

As shown in FIG. 1, a method for analyzing a multi-layer adhesive film of the present invention may comprise a specimen fixing step (S100) of adhering a specimen of a multi-layer structure adhesive film 10 to a specimen tray unit 100; a specimen cooling step (S200) of immersing the specimen 10 adhered to the specimen tray unit 100 in liquid nitrogen; a specimen pre-collection step (S300) of approaching a blade unit 200 to a first surface 111 of the specimen tray unit 100 on which the specimen 10 is adhered to contact or insert one end of the blade unit 200 into the specimen 10; a specimen collection step (S400) of moving the blade unit 200 in a direction parallel to the first surface 111 on the specimen tray unit 100 to scrape the specimen 10; and a blade separation step (S500) of moving the blade unit 200 to be spaced apart from the specimen tray unit 100 and the specimen 10.

The specimen fixing step (S100) may preferably precede the specimen cooling step (S200). It may be advantageous to fix the specimen 10 to the specimen tray unit 100 by utilizing the adhesive layer 11 formed on the specimen 10. Since the adhesive layer 11 is evenly formed on one overall surface of the specimen 10, the overall surface of the specimen 10 may be fixed to the specimen tray unit 100 with a uniform force when the specimen 10 is fixed to the specimen tray unit 100 with the adhesive layer 11. Since the specimen 10 can be deformed while being distorted with being cooled, fixing the specimen 10 before cooling allows to retain the flat shape and facilitate the collection of the specimen 10. In addition, in order to fix the specimen 10 to the specimen tray unit 100 before the initial adhesiveness is suppressed, the specimen fixing step (S100) may precede the specimen cooling step (S200).

After 2 seconds or more from immersing the specimen 10 in liquid nitrogen in the specimen cooling step (S200), a specimen collection step (S400) may be performed. More preferably, after 3 seconds or more, a specimen collection step (S400) may be performed. As the time for which the specimen 10 is cooled by liquid nitrogen to limit adhesiveness and secure hardness for collection, at least 2 seconds may be required.

The time taken from immersing the specimen 10 in liquid nitrogen in the specimen cooling step (S200) to the blade separation step (S500) may be 20 seconds or less. If more time passes, the specimen 10 may be separated from the specimen tray unit 100 or the specimen 10 may be broken. More preferably, the time taken from immersing the specimen 10 in liquid nitrogen in the specimen cooling step (S200) to the blade separation step (S500) may be 10 seconds or less. When replacing the specimen 10, it may be desirable to return the specimen tray unit 100 to room temperature and then adhere the specimen 10 to the specimen tray unit 100.

As shown in FIG. 4, when the thin slice sample is separated from the adhesive layer 11, the blade unit 200 may be inserted into the specimen 10 at a depth shorter than the thickness $t_1$ of the adhesive layer 11. Specifically, the adhesive layer 11 and the foam layer 12 may be inserted to a position spaced at least 20 μm from the boundary surface. That is, when the blade unit 200 is inserted into the upper surface of the specimen 10, the blade unit 200 may be inserted into the specimen 10 so that the lower end of the blade unit 200 is positioned 20 μm higher than the boundary surface between the adhesive layer 11 and the foam layer 12. The boundary surface 13 between the adhesive layer 11 and the foam layer 12 may be a surface including microscopic irregularity. Therefore, to prevent incorporation of the foam layer 12, the blade unit 200 may be preferably inserted at a depth shorter than the thickness $t_1$ of the adhesive layer 11 of the specimen 10.

The specimen pre-collection step (S300) and the specimen collection step (S400) may be repeatedly performed to remove the adhesive layer 11 when taking the foam layer 12, which is an intermediate layer positioned between the adhesive layers 11. As illustrated in FIG. 5, after removing the adhesive layer 11 by performing the specimen pre-collection step (S300) and the specimen collection step (S400) repeatedly, a thin slice sample of the foam layer 12 may be taken. In order to remove the adhesive layer 11, the surface of the specimen 10 may be removed by a thickness $t_2$ of at least 20 μm greater than the thickness $t_1$ of the adhesive layer 11. When removed by the thickness $t_2$, the specimen pre-collection step (S300) and the specimen collection step (S400) may be repeatedly performed several times, and the thickness to be removed at the first time may be 10 μm to 50 μm. When removed by the thickness $t_2$ at once or when collected by more than 50 μm, morphological change such as pressing or twisting of the specimen 10 may result in incorporation of components, and in more severe cases, the specimen 10 may be broken. Therefore, it is preferred that the specimen pre-collection step (S300) and the specimen collection step (S400) may be repeatedly performed several times.

EXAMPLE

As an acrylic foam tape, a three-layer structure film specimen laminated in the order of [adhesive layer]-[foam layer]-[adhesive layer] was analyzed. Specifically, in the specimen, the adhesive layer was composed of 2-EHA: DMAA(N,N-dimethylacrylamide):AA=68:30:2, and the foam layer had a resin composition of 2-EHA:AA=90:10.

The adhesive layer, which is a surface layer, is collected from the specimen within 30 seconds after supplying liquid nitrogen, and the foam layer, which is an intermediate layer, is collected after removing the adhesive layer. The collected specimen was analyzed for composition by using a Py-GC/MS method.

The specimen as collected was applied to the analysis. For Py-GC/MS, thermal decomposition occurred at 600° C., the column was UA-5 (0.25 mm ID×30 mL, 0.25 μm d.f. capillary), and the oven temperature was maintained at 50° C. for 5 minutes, raised to 320° C. at 10° C./min and maintained at the final 320° C. for 10 minutes.

FIG. 6 is a graph showing the compositions of the adhesive layer and the foam layer. According to the analysis results of a specimen by the apparatus for analysis of the multi-layer adhesive film and the method according to the present invention, it is found that DMAA is detected only in the adhesive layer. That is, in the apparatus for analysis of the multi-layer adhesive film and the method according to the present invention, only the layer to be collected was accurately and quickly collected without mixing between layers.

COMPARATIVE EXAMPLE 1

As an acrylic foam tape, a three-layer structure film specimen laminated in the order of [adhesive layer]-[foam layer]-[adhesive layer] was analyzed. Specifically, in the specimen, the adhesive layer was composed of 2-EHA: DMAA(N,N-dimethylacrylamide):AA=68:30:2, and the foam layer had a resin composition of 2-EHA:AA=90:10.

For GC/MS, the whole specimen was immersed and swelled in $CHCl_3$ and then MEOH was added to re-immerse the specimen, and the resulting supernatant was concentrated and applied to the analysis. The column was HP-5MS (0.25 mm ID×30 mL, 0.25 μm d.f. capillary), and the oven temperature was maintained at 50° C. for 5 minutes, raised to 320° C. at 10° C./min and maintained at the final 320° C. for 10 minutes.

For Py-GC/MS, the specimen was collected in tweezers at room temperature where adhesion was activated, and then applied to the analysis. Thermal decomposition occurred at 600° C., the column was UA-5 (0.25 mm ID×30 mL, 0.25 μm d.f. capillary), and the oven temperature was maintained at 50° C. for 5 minutes, raised to 320° C. at 10° C./min and maintained at the final 320° C. for 10 minutes.

FIG. 7a is a graph showing the results of analyzing whole layers of a specimen, by a conventional analysis method. It is an analysis of the composition by GC/MS after solvent extraction of all components of the acrylic foam tape. Since all components are detected simultaneously, it is impossible to separate the components for each layer, it takes several hours to extract and concentrate the solvent, and the volume of the foam layer increases, making the pretreatment process complicated.

FIG. 7b is a graph showing the results of analyzing the adhesive layer, which is a surface layer of the specimen, by a conventional analysis method. It is a Py-GC/MS analysis result of the adhesive layer, which is a surface layer. In the case of the adhesive layer, which is a surface layer, it is possible to take specimens by cross-section without pretreatment, but the components of the foam layer are incorporated due to the adhesiveness.

FIG. 7c is a graph showing the results of analyzing the foam layer, which is an intermediate layer of the specimen, by a conventional analysis method. It is a Py-GC/MS analysis result of the foam layer taken after pretreatment. The foam layer, which is an intermediate layer, is provided by immersing the entire specimen in a solvent to dissolving all the adhesive layer and drying it. In this case, the pretreatment process is very complicated and takes several hours, and the adhesive layer may remain or loss of the components of the foam layer may occur.

COMPARATIVE EXAMPLE 2

As an acrylic foam tape, a four-layer structure film specimen laminated in the order of [adhesive layer]-[foam layer]-[primer layer]-[adhesive layer] was analyzed.

For GC/MS, the entire specimen was immersed and swelled in $CHCl_3$ and then MEOH was added to re-immerse the specimen, and the resulting supernatant was concentrated and applied to the analysis. The column was HP-5MS (0.25 mm ID×30 mL, 0.25 μm d.f. capillary), and the oven temperature was maintained at 50° C. for 5 minutes, raised to 320° C. at 10° C./min and maintained at the final 320° C. for 10 minutes. The specimen was collected in tweezers at room temperature where adhesion was activated and applied to the analysis. Thermal decomposition occurred at 600° C., the column was UA-5 (0.25 mm ID×30 mL, 0.25 μm d.f. capillary), and the oven temperature was maintained at 50° C. for 5 minutes, raised to 320° C. at 10° C./min and maintained at the final 320° C. for 10 minutes.

While the specimen was immersed in the $CHCl_3$ solution, the primer layer caused the reduced adhesiveness at the boundary surface between the foam layer and the adhesive layer to separate the adhesive layer. However, since the adhesive layer was separated while the specimen was immersed in the $CHCl_3$ solution, incorporation of components occurred.

After several hours from placing the specimen in the solvent, the adhesive layer can be separated to obtain an intact film form and the adhesive layer can be washed and pretreated to apply to GC/MS or dried to apply to Py-GC/MS. However, there may occur problems such as complicated pretreatment, incorporation of components, and loss of components.

Although the embodiments according to the present invention have been described above, these are merely exemplary, and those skilled in the art will understand that various modifications and equivalent ranges of the embodiments are possible therefrom. Therefore, the true technical protection scope of the present invention should be defined by the following claims.

| Description of codes | |
| --- | --- |
| 10 specimen | 11 adhesive layer |
| 12 foam layer | 13 boundary surface |
| 100 specimen tray unit | 110 bottom surface portion |
| 111 first surface | 120 side wall portion |
| 200 blade unit | 210 blade portion |
| 211 protruding portion | 220 body portion |
| 300 driving unit | 400 liquid nitrogen supply unit |

What is claimed is:

1. An apparatus for analysis of a multi-layer adhesive film comprising:
a specimen tray unit on which a specimen of a multi-layer structure adhesive film is mounted,
a blade unit that is movable in the first vertical direction to the first surface of the specimen tray unit on which the specimen is mounted,
a liquid nitrogen supply unit for supplying liquid nitrogen so that the specimen mounted on the specimen tray unit is immersed, and
a driving unit for moving the specimen tray unit or the blade unit in a direction parallel to the first surface.

2. The apparatus according to claim 1, wherein the specimen tray unit comprises:
a bottom surface portion including the first surface, which is a flat surface to which the specimen is in contact, and
a side wall portion protruding in a vertical direction to the first surface along the edge of the bottom surface portion,
wherein the liquid nitrogen is filled in a container constituted of the bottom surface portion and the side wall portion.

3. The apparatus according to claim 2, wherein the bottom surface portion is made of stainless steel, and
the adhesive layer is formed on the surface of the specimen facing the bottom surface portion so that the specimen adheres to the bottom surface portion.

4. The apparatus according to claim 3, wherein the specimen is formed of adhesive layers on both sides, and a foam layer is provided between the two adhesive layers.

5. The apparatus according to claim 1, wherein the driving unit comprises:
a first driving portion for moving the blade unit in the first direction,
a second driving portion for moving the blade unit or the specimen tray unit in a second direction perpendicular to the first direction, and
a third driving portion for moving the blade unit or the specimen tray unit in a third direction perpendicular to the first direction and the second direction.

6. A method for analyzing a multi-layer adhesive film comprising:
a specimen fixing step of adhering a specimen of a multi-layer structure adhesive film to a specimen tray unit;
a specimen cooling step of immersing the specimen adhered to the specimen tray unit in liquid nitrogen;
a specimen pre-collection step of moving a blade unit to the first surface of the specimen tray unit on which the specimen is adhered in order to make one end of the blade unit in contact with or inserted into the specimen;
a specimen collection step of moving the blade unit in a direction parallel to the first surface on the specimen tray unit to scrape the specimen; and a blade separation step of moving the blade unit to be spaced apart from the specimen tray unit and the specimen.

7. The method according to claim 6, wherein in the specimen fixing step, the specimen is formed of an adhesive layer on the surface, and the specimen is fixed to the specimen tray unit by bringing the adhesive layer into contact with the first surface of the specimen tray unit.

8. The method m according to claim 6, wherein in the specimen cooling step, the liquid nitrogen is supplied into the specimen tray unit so that the specimen is immersed by 3 to 5 mm.

9. The method according to claim 6, wherein the time taken from immersing the specimen in liquid nitrogen in the specimen cooling step to the blade separation step is 20 seconds or less.

10. The method according to claim 6, wherein after 2 seconds or more from immersing the specimen in liquid nitrogen in the specimen cooling step, a specimen collection step is performed.

11. The method according to claim 6, wherein the specimen is formed of adhesive layers on both sides, and a foam layer is provided between the two adhesive layers, and the specimen pre-collection step and the specimen collection step are repeatedly performed when taking the foam layer.

* * * * *